United States Patent [19]

Dijkhuizen et al.

[11] Patent Number: 5,266,253
[45] Date of Patent: Nov. 30, 1993

[54] METHOD OF MANUFACTURING MOLDED POLYMER ARTICLES CONTAINING HIGHLY FILLED CASTING RESINS AND HAVING COLOR DIFFERENTIATED SURFACE REGIONS

[75] Inventors: Okko K. Dijkhuizen, Roden, Netherlands; Manfred Krieg, Darmstadt; Guenther Ittmann, Gross-Umstadt (Heubach), both of Fed. Rep. of Germany

[73] Assignees: Roehm GmbH Chemische Fabrik, Darmstadt, Fed. Rep. of Germany; Bowic B.V., Roden, Netherlands

[21] Appl. No.: 905,511

[22] Filed: Jun. 29, 1992

[30] Foreign Application Priority Data

Aug. 6, 1991 [DE] Fed. Rep. of Germany ....... 4126024

[51] Int. Cl.$^5$ .......................... B29C 39/12; B32B 7/00
[52] U.S. Cl. ..................................... 264/112; 264/245; 264/255
[58] Field of Search ................. 264/112, 113, 245, 255

[56] References Cited

U.S. PATENT DOCUMENTS

| | | | |
|---|---|---|---|
| 1,454,939 | 5/1923 | Michaelson | 264/245 |
| 4,244,993 | 1/1981 | Platka, III et al. | 264/245 |
| 4,405,551 | 9/1983 | Barnard et al. | 264/245 |
| 5,087,405 | 2/1992 | Maker | 264/255 |

FOREIGN PATENT DOCUMENTS

| | | |
|---|---|---|
| 0164847 | 12/1985 | European Pat. Off. . |
| 969583 | 9/1964 | United Kingdom . |
| 1076167 | 7/1967 | United Kingdom . |

*Primary Examiner*—Mary Lynn Theisen
*Attorney, Agent, or Firm*—Oblon, Spivak, McClelland, Maier & Neustadt

[57] ABSTRACT

The present invention relates to a method of manufacturing molded polymer articles comprised of casting resins and having color-differentiated surface regions, wherein prior to the charging of the casting resin, a surface region of the molding implement is coated with a hardenable coating of a colorant-containing composition, producing color-differentiation in the surface of the molded articles. The designated surface regions of the molding implement are coated with at least two layers, whereby, according to the present method, the first coating step applies a filler-containing coating dispersion (L-1) without added colorant, and the second coating step applies a colorant-containing coating (L-2) without filler. Thereafter, the coating layers are dried, the casting resin is charged to the molding implement, the resin is polymerized by heating, and the molded articles removed from the mold.

14 Claims, No Drawings

METHOD OF MANUFACTURING MOLDED POLYMER ARTICLES CONTAINING HIGHLY FILLED CASTING RESINS AND HAVING COLOR DIFFERENTIATED SURFACE REGIONS

BACKGROUND OF THE INVENTION

1. Field of the Invention

The present invention relates to a method of manufacturing molded polymer articles containing highly filled casting resins and having color-differentiated surface regions, wherein surface regions are produced by a coating process which applies at least two layers, with fixing.

2. Discussion of the Background

In Ger. Pat. 693,824, the production of colorant-containing coatings or layers in molded polymer articles is described, in which coatings may be embedded directly under the surface. The molded articles are manufactured by polymerization in a mold. According to the method, the coatings contain a binder which is practically insoluble in the compounds to be polymerized, and are applied to the walls of the mold. Thereafter, the liquid compounds to be polymerized are charged into the mold, and polymerization is conducted in known fashion.

The colorant-containing coatings may be distributed uniformly or non-uniformly. Where a plurality of different colorant-containing coatings are employed, the surfaces may be multicolored. Among other things, provision is made to employ solvents, which may be organic, for the binders. The method makes it unnecessary to after-treat; i.e., to apply a finish coat.

German OS 3,023,964 describes a method of producing colorant-containing zones in (meth)acrylic resins in the near-subsurface region in the course of polymerization of the monomers and prepolymers which form the resins, in molding-type polymerization chambers. In the method, one first coats the walls of said chambers with a binder containing uniformly distributed colorants. The binder is soluble or at least incorporable into a foam comprising the liquid resin and/or the prepolymer stages of said resin. After the monomers and/or prepolymers which are to take part in the polymerization are charged, the polymerization to form the resins is carried out in a manner which is per se known.

From European Patent No. 061,245, a method of producing a molded article is known, wherein the composition is cured in a mold which contains at least two molded pieces defining a hollow cavity. Prior to the introduction of the curable composition into the mold cavity, at least part of the surface defining the cavity is provided with a deposit comprised of a material which presents a color contrast to the curable composition. The deposit is disposed on surfaces of the mold which correspond to the surfaces of the cured molded article on which the color contrast is to be produced. The deposit is comprised of at least one finely divided pigment in a mixture with at least one finely divided filler of mean particle size $\leq 100$ microns. The mixture is applied as a suspension in a volatile vehicle.

European OS 0,217,544 describes a method of manufacturing molded articles comprised of cured compositions having surface regions of color contrast. Prior to the charging of the curable compositions, a surface of the mold is coated with a colorant agent comprised of:

(a) at least 25 wt. % of a liquid vehicle comprised of 0-100 parts by weight (pbw) of a polymerizable liquid and 100-0 pbw of a non-polymerizable organic liquid;

(b) 0.1-10 wt. % of an inorganic pigment, or 0.0001-1 wt. % of an organic colorant;

(c) 0-60 wt. % of a finely divided filler;

(d) 0.1-50 wt. % of an alkyd resin, which is soluble in the vehicle (a); and (e) a polymer soluble in the liquid.

The polymeric molded articles having differentiable or contrasting colored surfaces are desired particularly in the fields of sanitary ware material. However, the state of the art manufacturing methods described above are unsatisfactory. In particular, better resistance to stresses which cause scratching and abrasion of the colorant-containing surface layer and better intensity of color are sought.

SUMMARY OF THE INVENTION

Accordingly, one object of the present invention is to provide a novel method for manufacturing molded polymer articles exhibiting improved resistance to stresses.

Another object of the present invention is to provide a novel method of manufacturing molded polymer articles which exhibit improved resistance to scratching and abrasion of the colorant-containing surface layer.

Another object of the present invention is to provide a novel method of manufacturing molded polymer articles which exhibit an improved "water-whitening effect" (tendency to fade or whiten under the action of moisture).

These and other objects which will become apparent during the following detailed description of the preferred embodiments have been accomplished by a novel method of manufacturing molded polymer articles having color-differentiated surface regions, comprising the successive steps of:

(a) coating a mold with a filler-containing dispersion without added colorant, to produce a coated mold;

(b) coating said coated mold with a colorant-containing layer without filler, to produce a colorant-containing coated mold;

(c) charging said colorant-containing coated mold with a casting resin;

(d) polymerizing said casting resin to produce a molded polymer article; and (e) removing said molded polymer article from said mold.

DESCRIPTION OF THE PREFERRED EMBODIMENTS

The present method of manufacturing polymeric molded articles comprised of casting resins and having color-differentiated surface regions thoroughly satisfies the requirements of the art.

The present invention relates to a method of manufacturing molded polymer articles comprised of highly filled casting resins (i.e., those resins containing large amounts of filler; e.g., -20% by weight) and having color-differentiated surface regions. According to the present method, the surface of the molding implement (the mold itself, which may comprise two or more separable sections) is coated with a curable coating comprising a colorant-containing composition prior to the charging of the casting resin into the molding implement. Color differentiation is produced by the colorant-containing coating on the surface of the mold.

The coating is applied to the designated surface of the molding implement in at least two coating steps. In the first coating step, a filler-containing coating dispersion (L-1) without added colorant is applied to selected surface regions of the mold. In a second coating step, a colorant-containing coating (L-2) without added filler is applied to selected surface regions of the mold. Optionally, in a third coating step, a filler-containing coating (L-1') without added colorant is applied to selected surface regions of the mold. Thereafter, the coating layers are dried. The casting resin is charged to the molding implement, the resin is polymerized by heating, and the colored molded article is removed from the mold.

Preferably the coatings (L-1) and (L-1') are of the same type and particularly preferably, are identical. In accordance with the state of the art, the casting resins used according to the present invention are plastic resins. Suitable resins are liquid or are liquefiable by moderate heating, are castable in molds, and are curable. The polymeric molded articles are formed when the resins are cured.

Suitable exemplary casting resins (G), and corresponding prepolymers are disclosed in European Pat. No. 218,866 and U.S. Pat. Nos. 4,786,660, 4,221,697, and 4,251,576, which are incorporated herein by reference. Preferably, the casting resins (G) which are candidates for use belong to the class of acrylic resins. Particularly preferably, the resins comprise polymers based on methyl methacrylate (e.g. polymethyl methacrylate (PMMA)), and advantageously, a mixture of a prepolymer and the particularly preferred monomers is employed.

Preferably, the resins are filler-containing (so-called "filled") resins. Particularly preferably, they are highly filled resins, most particularly where the filler is present in an amount of from 50 to 80 weight percent (wt. %) of the weight of the casting resin.

The fillers (F) which are candidates for use with the casting resins are fine-particulate inorganic or organic materials, advantageously having a particle diameter of 100 microns or less, preferably not exceeding 50 microns. Particularly preferably, $\geq 95\%$ of the filler particles have a size (diameter) $\leq 10$ microns. To the extent by which it is possible to control the particle size, not more than 10% (by number) of the total number of particles should have a particle size of $\leq 0.1$ micron. Particle sizes are determined by known methods (see Scarlett, B., (1965), "Filtration and Separation," p. 215). The largest dimension of a particle is considered in determining the particle size. The preferred particle shape is granular. Sometimes it may be advantageous to remove adsorptive moisture by heating the particles to about 150° C. The fillers (F) may be natural or synthetic products. The mechanical properties, such as hardness and elastic shear modulus, are selected based on the proposed application purpose of the casting resins. It may be advantageous to adjust the elastic shear modulus to at least 5 GN/m$^2$ Giga Newton square meter or to select a material satisfying this constraint. Suitable fillers are, e.g., minerals, such as aluminum oxides and aluminum hydroxides, and derivatives of minerals, such as alkali double oxides, alkaline earth double oxides and alkaline earth hydroxides; clays; silicon dioxide in its various forms and modifications; known silicates, aluminosilicates, carbonates, phosphates, sulfates, sulfides, and oxides; carbon; metals; and metal alloys. Other suitable fillers are synthetics such as ground glass, ceramics, porcelain, slag, and finely divided synthetic SiO$_2$. Other suitable fillers are modified silicic acid fillers such as quartz (ground quartz), tridymite and cristobalite, as well as kaolin, talc, mica, feldspar, apatite, barytes, gypsum, chalk, limestone, and dolomite. It is also possible to employ mixtures of fillers.

The amount of filler in the casting resins is generally at least 20 wt. % and not greater than 80 wt. % (i.e., the amount of filler present is 20-80 wt. % of the sum of the amounts of filler (F) and casting resin (G)). Ordinarily, the range is 50-80 wt. %. Fillers having an advantageous particle size can be manufactured according to known methods; e.g., comminution and milling. Cristobalite is a particularly preferred filler.

The present method is used to obtain the color-differentiated surface regions by means of (as mentioned above) at least a two-step coating procedure, preferably at least a three-step coating procedure.

In the first coating step a filler-containing coating dispersion (L-1) *without* added colorant is employed. The filler-containing coating dispersion is comprised of a polymeric binder (B) and a liquid vehicle (T), in addition to the filler (F').

The filler (F') of the coating layer meets the specifications given above for the filler (F). Accordingly, there is relatively wide leeway in the choice of filler, which can be exploited to optimize the desired set of properties. Preferably, the particle size of filler (F') is in the range 0.5-30 microns, particularly preferably 1-20 microns, more particularly 1-10 microns. Preferably, the Mohs hardness (see "Roempps Chemie-Lexicon," 9th ed., Georg Thieme Verlag (1990), p. 1700) of the fillers (F) and (F') is $\geq 6$.

Suitable coating layer fillers (F') include silicon dioxide in its various forms and modifications; silicates and aluminosilicates; aluminum oxides, aluminum hydroxides, and derivatives of these; and, particularly, synthetic materials such as glass beads, ground glass, ceramics, and porcelain; and mixtures of these. The use of silanized fillers has proved advantageous, some of which are available commercially. The relevant silanization can be performed with methacryloylsilane, vinylsilanes, aminosilanes, etc. (see Skudelny, D., *Kunststoffe*, vol. 77 (1987), pp. 1153-1156; *Kunststoffe*, vol. 68 (1978); and "DYNASILAN ® Haftvermittler," a company publication of the firm Dynamit Nobel, Chemie).

The functions of the binder (B) in the coating dispersion (L-1) are essentially to provide a matrix for the filler (F'), and to aid in fixing the filler to the surface of the molding implement. Candidates for use as polymeric binders are those of the state of the art (see Mark, H. F., et al., "Encyclopedia of Polymer Science and Technology," 2nd ed., vol. 3 (1985), J. Wiley & Sons, NY, pp. 615-628).

In general, the filler (F') and binder (B) are present in a weight ratio of from 1:1 to 20:1, preferably from 2:1 to 10:1. Generally, the applicable binders (B) can be classified into either of two groups: polymeric binders (B-P), and reactive binder systems (B-R) (See Wagner, H., and Sarx, H. F., "Lackkunstharze," Carl Hanser Verlag, Munich, Germany (1959)). The binders are soluble in the vehicle component (T).

The polymeric binders (B-P) advantageously belong to the same class of polymers as the casting resins themselves. For example, they may be chosen from the group of poly(meth)acrylates, particularly polymethyl methacrylate and its copolymers. In general the weight-average molecular weight Mw
of the polymeric binders is in the range 10,000–1,000,000 Daltons, preferably in the range 100,000–500,000 Daltons, with the condition that the binders must be soluble in the vehicle component (T). The binder (B-P) is provided in dissolved form in a suitable solvent, preferably in the vehicle component (T).

It is not essential that the polymeric binder (B-P) be provided, but at least one reactive binder system (B-R) is required for the hardening. Such systems are comprised of two or more components which will cure under the prevailing conditions. (See Wagner, H., and Sarx, H. F., loc. cit.; "Kirk-Othmer Encyclopedia of Chemical Technology," 3rd ed., vol. 6, John Wiley & Sons, New York (1979), pp. 427–445.)

Usable binders may be selected from the group consisting of polycondensation resins, polyaddition resins, and polymerization resins. Examples are the following classes:

Alkyd resins, particularly oil-modified alkyd resins, e.g. oxidized alkyl resins; Alkyd resins plus diisocyanates; Alkyd resins plus phenoplasts; Alkyd resins plus chlorinated plastics; Alkyd resins plus polystyrene; Alkyd resins plus nitrocellulose; Alkyd resins plus vinyl- and epoxy-resins; Alkyd resins plus aminoplasts (plus epoxy resins); Alkyd resins plus silicones;

Oil-modified epoxy resins plus aminoplasts, with the oil content preferably in the range 20–80 wt. %;

Phenoplasts (with or without epoxy, vinyl acetal, or aminoplast components);

Vinyl acetals, with or without phenolic allylaminoplastic components;

Polyester and triazine resins;

Allylpolyesters;

Complex amino resins;

Indene and cumarone resins.

Suitable candidates include, e.g., binder systems (B-R) comprising, e.g., an aromatic polyisocyanate (e.g., commercial products such as DESMODUR ®, produced by Bayer AG, and similar products); polyesters or polyethers with free hydroxyl group (e.g., commercial products such as DESMOPHEN ®, produced by Bayer AG, and similar products) or with hydroxyl group-containing acrylic resins (e.g., the commercial product JAGOTEX®; F232, produced by the firm Jaeger Fabrik Chemischer Rohstoffe and similar products).

In order to achieve three-dimensional crosslinking, at least one of the components undergoing polymerization must have three or more reactive groups in its molecule. Preferably, one or more catalysts are added, which are per se known. Particularly suitable catalysts are Sn compounds and/or Zn compounds; e.g., salts of fatty acids such as, e.g., dibutyltin laureate and/or zinc octanoate, in the customary amounts, e.g., in the range of 1–50 parts per thousand by weight.

The coatings (L-1), (L-2), and/or (L-1') may also contain functionalized monomers such as (meth)acrylic acid, to improve the adhesion both between these coatings, and with the molded article. The functionalized monomers may be present in amounts of 1–50 wt. %, based on the total weight of the binders (B-P) and (B-R). Also present in the coatings may be crosslinking monomers which are per se known (see Rauch-Puntigam, "Acryl- und Methacrylverbindungen," Springer-Verlag (1967)), e.g., (meth)acrylate esters of polyhydric alcohols (polyols), e.g., glycol dimethacrylate. These may be present in amounts <15 wt. % of the binders (B-P) and (B-R). For example, candidates for binders include combinations of:

binders (B-P), such as polymethyl methacrylate, optionally having a proportion of comonomer, usually ≦15 wt. %, e.g., methyl acrylate or ethylhexyl (meth)acrylate, and binder systems (B-R), e.g., formed from an aromatic polyisocyanate (e.g. the commercial product DESMODUR ® N 75) and a hydroxyl-group-containing polyacrylate (e.g. the commercial product JAGOTEX ® F 232). A suggested range of weight ratios of (B-P) to (B-R) is from 3:1 to 2:1.

The liquid vehicle component (T) in the coating (L-1) provides sprayability and evaporates after a certain predetermined (drying) time. Accordingly, a suggested boiling point (under standard conditions, such as a pressure of one atmosphere) for the vehicle component (T) is in the range 50–220° C., preferably 75–170° C. A satisfactory result may also be obtained with a combination of a higher boiling component and a lower boiling component.

The vehicle component (T) may be advantageously chosen from the group consisting of:

monomers (T-M), particularly radically polymerizable monomers, e.g., such as (meth)acrylic acid esters, particularly with C1–C6 alkyl groups (i.e., (meth)acrylic acid esters of C1–C6 alcohols), most particularly methyl and ethyl esters of (meth)acrylic acid; and solvents (T-S), e.g., such as hydrocarbons, aromatic hydrocarbons or ketones.

An additional selection criterion which may be employed for the vehicle component (T-L) is an evaporation number of 2–100 (based on diethyl ether having an evaporation index of 1), particularly those vehicle components having an evaporation index of 2.5–50. In this connection, the "evaporation number" is defined as the time in which a certain amount of solvent, viz. the amount of solvent applied to filter paper over 5 seconds from a distance of 10 mm (which amount is typically 0.3 ml), is evaporated in comparison to diethyl ether (see DIN 53,170; and "Ullmanns Encyclopaedie der Technischen Chemie," 4th ed., vol. 16, Verlag Chemie (1978), p. 289).

Examples of particularly preferred vehicle components (T-M) are methyl methacrylate (MMA), methyl acrylate, ethyl methacrylate, and n-butyl methacrylate.

Examples of particularly preferred vehicle components (T-L) are butyl acetate and ethoxyethyl acetate.

A combination of a (T-L) and a (T-M) may be advantageously employed. In general, the weight ratio of the vehicle component (T) to the filler component (F') is in the range of from 10:1 to 0.5:1.

The colorant-containing coating (L-2) used in the second coating step must contain the vehicle component (T), along with one or more colorants (FM), dispersed or dissolved in the coating.

Preferably, the coating also contains binders (B) in the form of (B-P) and/or (B-R).

In general the proportion of the vehicle component (T) in the coating (L-2) is in the range of 40–90 wt. %, and the proportion of the polymeric binder (B-P) is in the range of 0–20 wt. %, preferably 0.5–10 wt. %, particularly preferably 1–10 wt. %.

Ordinarily, the proportion of the colorant (FM) in the coating (L-2) is in the range of 0.1–10 wt. %, preferably 1–5 wt. %.

A typical composition for the coating (L-2) may thus be (units in parts by weight, "pbw"):

| | |
|---|---|
| Methyl methacrylate | about 67.5 pbw |
| PMMA | 5.5 pbw |
| Colorant | 2.3 pbw |
| 2-Component binder (B-R) | 23.0 pbw. |

The binder might comprise, e.g., JAGOTEX ® F 232 and DESMODUR ® N75 in a ratio of 3:1 by weight. The solvent used for (B-R) is that used in (T) disclosed above, e.g., butyl acetate, ethyl acetate, or a monomer such as MMA.

Suitable candidates for use as the colorants (FM) include customarily used pigments or dyes (see Lueckert, M., and Lueckert, O., "Pigment- und Fuellstofftabellen," Laatzen (1980); and Batzer, H., "Polymere Werkstoffe," vol. II, Georg Thieme Verlag (1984), pp. 337-353). Suitable white pigments include, e.g., pigments containing $TiO_2$ and/or ZnS; suitable yellow and red pigments includes e.g., pigments containing iron oxide; suitable black pigments include, e.g., pigments containing carbon black; and suitable blue and green pigments includes, e.g., pigments containing ultramarine and/or cobalt.

A particularly preferred procedure for preparing the coating (L-1) is as follows:

All of the components with the exception of the binder (B-R) are dispersed in the vehicle (T), advantageously with the aid of a dissolver apparatus. The binder component (B-R) is then added and dissolved. The coating (L-2) may be prepared analogously, advantageously with the use of a disperser apparatus (employing the rotor-and-stator principle). In this way, the colorant (FM) is thoroughly dispersed in the mixture.

The substance composition of the coating (L-1') which is preferentially employed in a third coating step corresponds to that of the coating (L-1), and particularly preferably is identical to that of (L-1). However, a coating (L-1') may be employed which is different from (L-1).

THE INVENTIVE METHOD

The inventive method employs customary molding implements (or molds) and spraying equipment. The modalities of the application may be advantageously demonstrated on a metal plate (e.g., a nickel-coated highly polished brass plate). A suitable temperature for the metal surfaces to be used in the coating process is 70° C. It is recommended that advance heating of the plate take place for about 30 minutes, e.g., heating the mold in a drying cabinet at 70° C. A suitable spray gun may be used for the coating application, e.g., a SATA ® MINIJET, e.g., with a 0.8 mm nozzle and a pressure of 2.5 bar. Advantageously, the individual coating layers are each produced with two spray coats of the respective coating materials (L-1), (L-2), and optionally (L-1'), on the surface regions provided therefor. Obviously, the coatings (L-1) and (L-1') may be applied beyond the surface regions coated with the coloring coating (L-2). The coating process generally takes 2-2.5 min. Immediately after the final coating is applied, the mold having a coated surface is returned to the heating chamber (drying cabinet) at 70° C.

Within a very short time, e.g., less than 5 minutes, advantageously the casting resin (G) is charged (injected into the coated mold). The remainder of the procedure will be described using the example of a PMMA/MMA casting resin.

In this example, a molding chamber is formed within about 3 minutes, using the metal plate to which the described coating has been applied, a matching plate which is not so coated (suggested size 350×350×4 mm), and a flexible rod seal (comprised, e.g., of a flexible PVC rod with a diameter of 4 mm). The casting resin, which generally is colored and has been degassed, is charged to this chamber. In this example, the resin is PMMA/MMA. At least one initiator for the radical polymerization is also charged. This may be, e.g., a perester, such as bis-(4-tert-butylcyclohexyl)peroxydicarbonate, in a typical amount (e.g., 0.5-5 wt. %, based on the weight of the monomers). The charging process is carried out quickly, e.g., in about 1.5 minutes. After the molding chamber is sealed, the chamber is held at controlled elevated temperatures; for example, first at 65° C. for, e.g., 20 minutes in a water bath, advantageously with the chamber in a horizontal position with the side coated with the coating being disposed bottomward, followed by treatment at a higher temperature, e.g., 100° C., preferably in the drying cabinet.

The molding chamber is then removed, and the molded article withdrawn, for example, at 60-70° C.

ADVANTAGEOUS EFFECTS

The present method results in molded articles having color-differentiated surface areas exhibiting substantially improved resistance to abrasion and scratching, compared to the state of the art. The present method can be employed to protect not just the color-differentiated surface regions, but the entire exposed surface. The coloration of the surfaces of the articles prepared by the present method is deeper, and displays a higher gloss.

Other features of the present invention will become apparent in the course of the following descriptions of exemplary embodiments which are given for illustration of the invention, and are not intended to be limiting thereof.

The reduced viscosity, $\eta$ spec/c, was determined based on the German Standard Industrial Tests DIN 1342, DIN 51,562, and DIN 7745.

EXAMPLES

Example 1

Coating (L-1-1)

A polymethyl methacrylate (3.5 pbw) copolymer with a 10 wt.% content of methyl acrylate (Mw=about 350,000) was dissolved in methyl methacrylate (75 pbw), and silanized cristobalite (45 pbw SILBOND ® 6000 MST, supplied by the firm Quarzwerke Frechen) was dispersed in this solution, using a dissolver at a speed of 10.0 m/sec for 15 min. A hydroxyl-group-containing acrylic resin (4.35 pbw of JAGOTEX ® F232, supplied by the firm E. Jaeger, Dusseldorf, Germany, containing 3.6% OH groups, dissolved in the solvent mixture xylene:SOLVESSO 100:butyl acetate 2:1:1) and an aromatic polyisocyanate (1.4 pbw of DESMODUR ® N75, supplied by Bayer AG, of Leverkusen, containing 16.5% NCO groups, dissolved in the solvent mixture ethylene glycol acetate:xylene 1:1) were dissolved in this suspension. To this, dibutyltin dilaurate (0.076 pbw) was added as a catalyst.

Example 2

Coating (L-2-1)

A brown colorant paste was prepared as follows:

Titanium dioxide (0.7 pbw), iron oxide red (1.7 pbw), and iron oxide black (0.06 pbw) were dispersed in methyl methacrylate (about 46 pbw, into which 5 pbw PMMA [having an $\eta$ spec/c=50–55 cc/g]had been dissolved), in a rotor-stator disperser (ULTRATUR-RAX ®, supplied by the firm Janke and Kunkel, of Freiburg, Germany). Dispersing was continued until the temperature reached 55° C. Methyl methacrylate (21.5 pbw), a hydroxyl group-containing acrylic resin (17.4 pbw of JAGOTEX ® F232), an aromatic polyisocyanate (5.6 pbw of DESMODUR ® N75), and dibutyltin dilaurate (0.015 pbw) were added to this colorant paste.

The quality of the coating which leads to color-differentiated surface regions can be studied with test methods adapted to the particular application, e.g., in the cooking sanitary ware areas.

Test for resistance to abrasion: Sand blasting test

The coating quality was determined by treating with a stream of sand propelled by compressed air. The blast material comprised BALLONTINI ® glass spherules. The speed of which the test sample was promoted was 450 mm/min.

The test pieces were plates sawed to a size of 10×20 cm.

The test pieces were clamped in a rigid array on a movable milling machine table. The sand blasting pistol was fixed at the location of the milling head. The table was then raised until it rested against the rubber outlet sheath of the pistol. During a given test, the apparatus was thereafter left unaltered.

The pressure of the compressed air could be adjusted by means of a reducing valve. One stroke was made at each pressure.

Test piece (I) was produced according to European AS 0,061,245. Test piece (II) was produced according to the present invention with both coating (L-1-1) and coating (L-2-1).

In both test pieces I and II, the casting resin (G) was identical.

TABLE

| Pressure (bar) | Test Piece (I) | Test Piece (II) |
|---|---|---|
| 6 | a | b |
| 5 | a | c |
| 4 | b | c |
| 3 | c | e |
| 2 | d | e |
| 1 | e | e |
| 0.5 | e | e |

KEY TO TABLE:
a = Pigment completely removed, and very substantial loss of gloss.
b = Pigment partially removed, and some loss of gloss.
c = Pigment intact, but some loss of gloss.
d = Slight loss of gloss.
e = No reduction in gloss.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of United States is:

1. A method of manufacturing molded polymer articles containing casting resins and having color-differentiated surface regions, comprising the successive steps of:
   (a) coating a mold with a filler-containing dispersion without added colorant, to produce a coated mold;
   (b) coating said coated mold with a colorant-containing layer without filler, to produce a colorant-containing coated mold;
   (c) charging said colorant-containing coated mold with a casting resin;
   (d) polymerizing said casting resin to produce a molded polymer article; and
   (e) removing said molded polymer article from said mold.

2. The method of claim 1, further comprising the steps of drying said colorant-containing layer without filler after said coating step (b), and applying a second filler-containing coating without colorant following said drying prior to said charging step (c).

3. The method of claim 2, wherein said second filler-containing coating comprises the same material as said filler-containing dispersion without added colorant in step (a).

4. The method of claim 1 or 3, wherein said filler-containing dispersion without added colorant in step (a) comprises a polymeric binder, a liquid vehicle component, and a filler.

5. The method of claim 1, wherein said colorant-containing layer without filler comprises at least one colorant and a liquid vehicle component.

6. The method of claim 5, wherein said colorant-containing layer without filler further comprises a binder.

7. The method of claim 6, wherein said binder is polymeric, and is formed partly or completely from a hardening system which comprises at least two reactive components.

8. The method of claim 6, wherein said binder comprises a polymer and a hardening system having at least two reactive components.

9. The method of claim 8, wherein said polymer is a homo- or copolymer of methyl methacrylate.

10. The method of claim 4, wherein said liquid vehicle component has a boiling point of 50–220° C.

11. The method of claim 10, wherein said liquid vehicle component has a boiling point of 75–170° C.

12. The method of claim 10, wherein said liquid vehicle component comprises monomers which can undergo radical polymerization.

13. The method of claim 12, wherein said liquid vehicle component comprises one or more alkyl esters of (meth)acrylic acid having 1–6 C atoms in the alkyl group.

14. The method of claim 12, wherein said liquid vehicle component comprises methyl methacrylate.

* * * * *